July 25, 1939.  M. I. GINSBURG  2,167,450
POWER TRANSMITTING UNIT
Filed Jan. 25, 1937  3 Sheets-Sheet 2
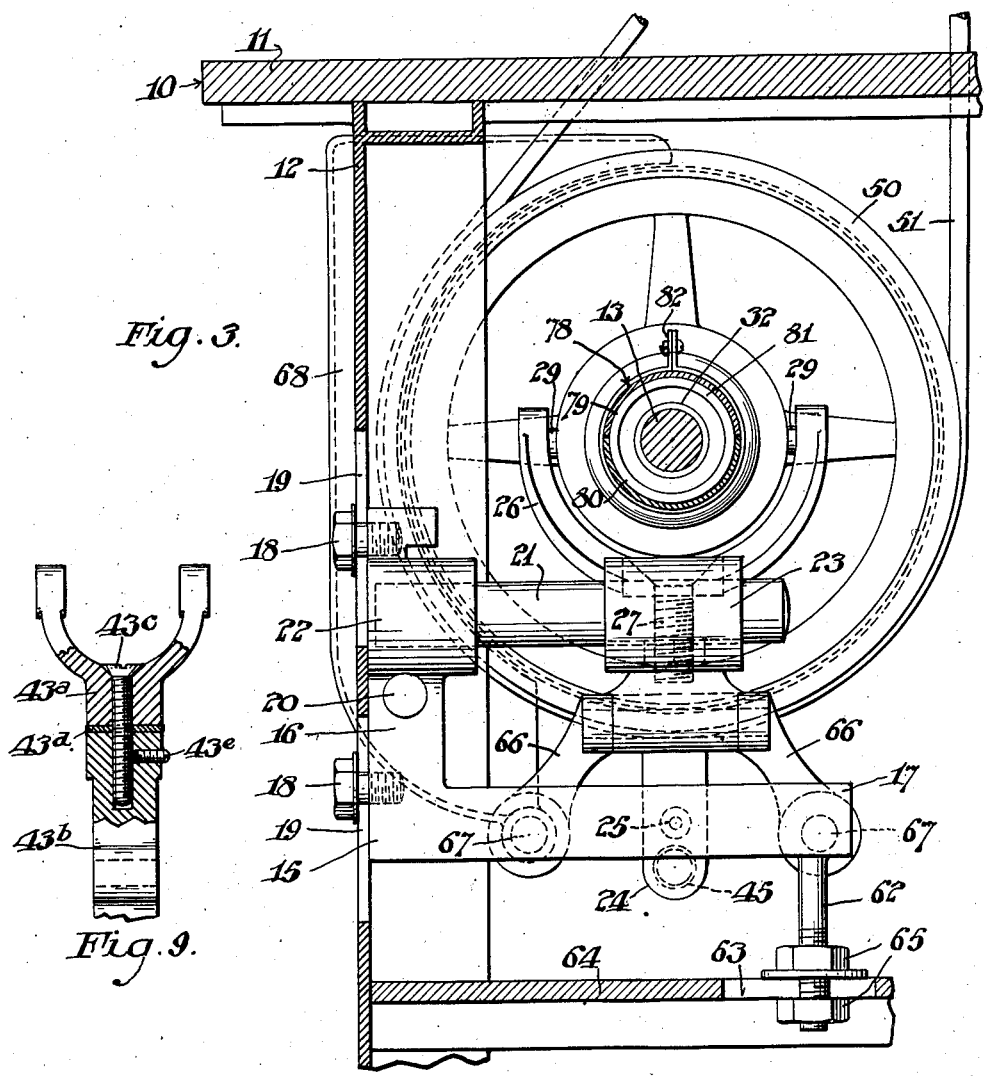
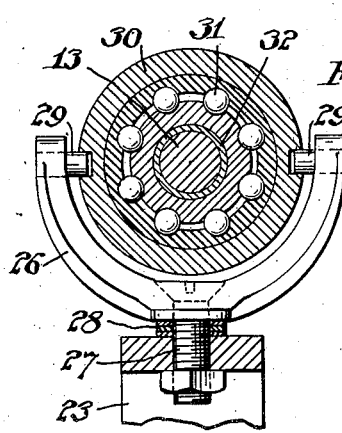
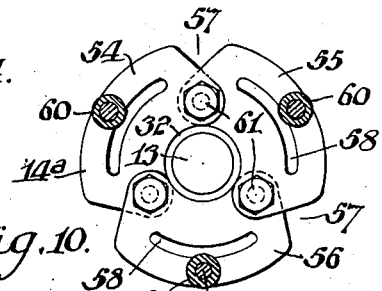
Inventor:
Michael I. Ginsburg,
By W. W. Williamson
Attorney.

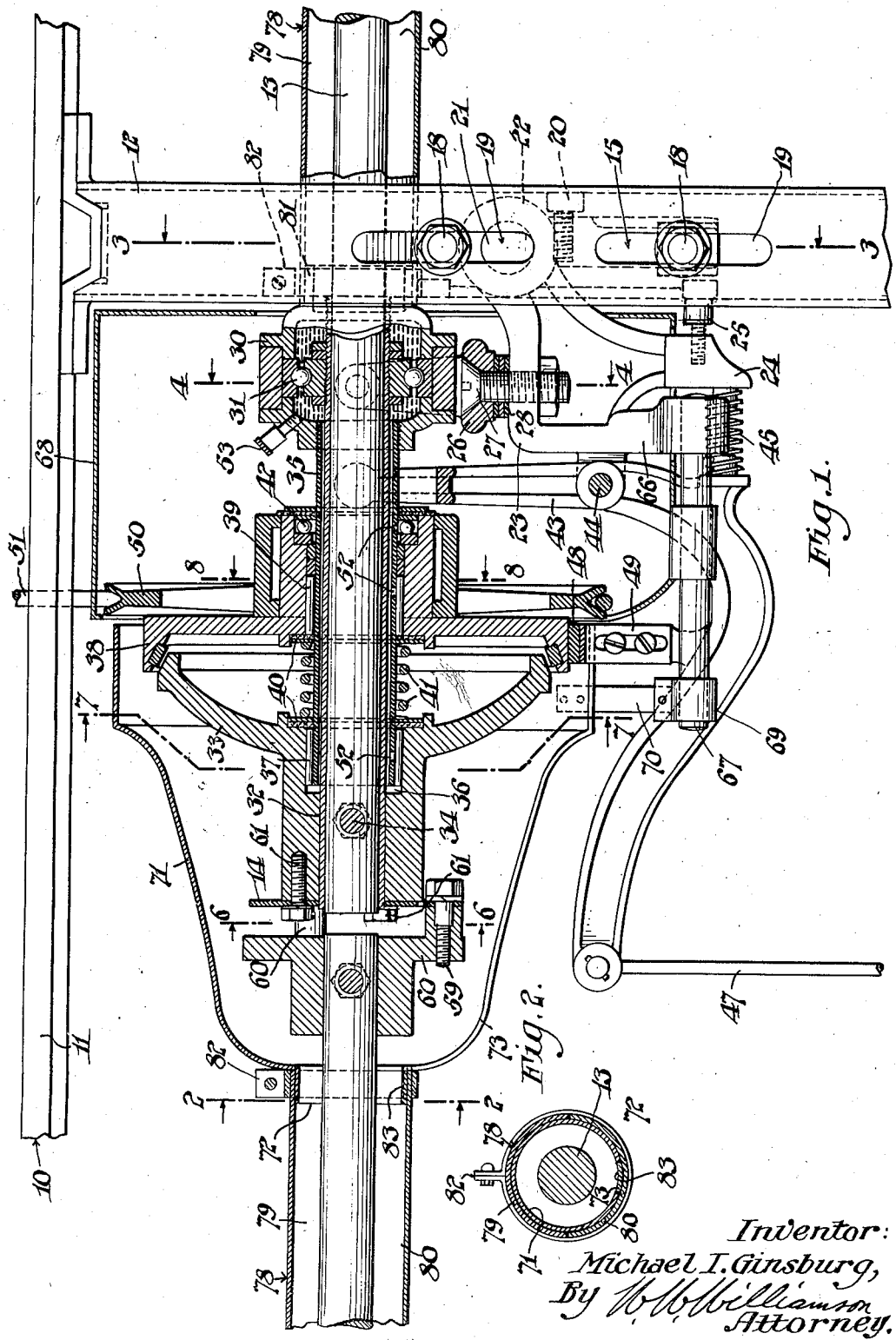

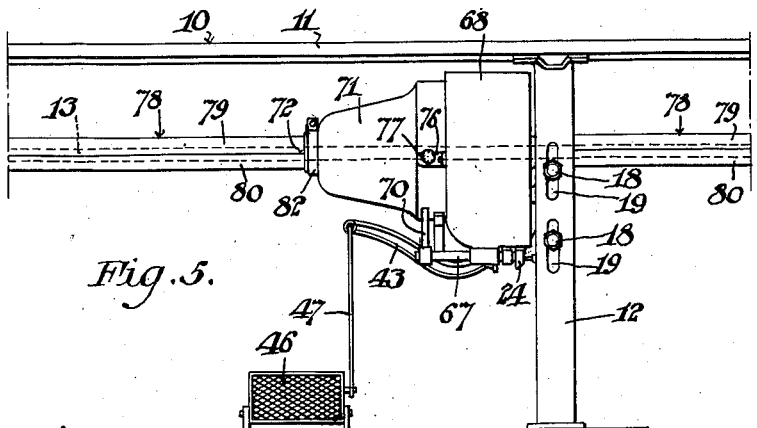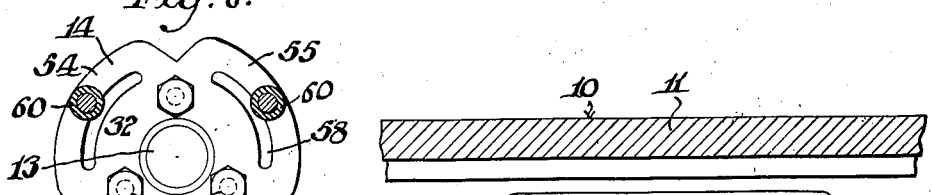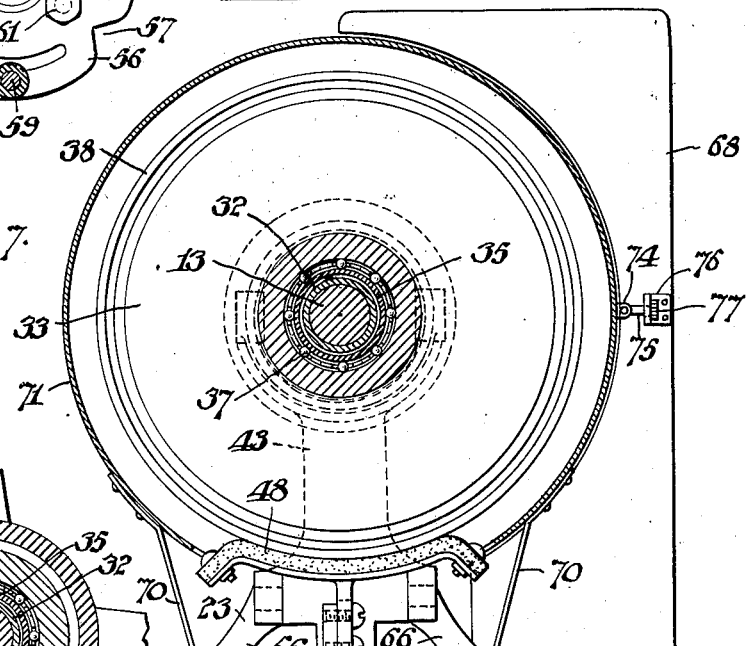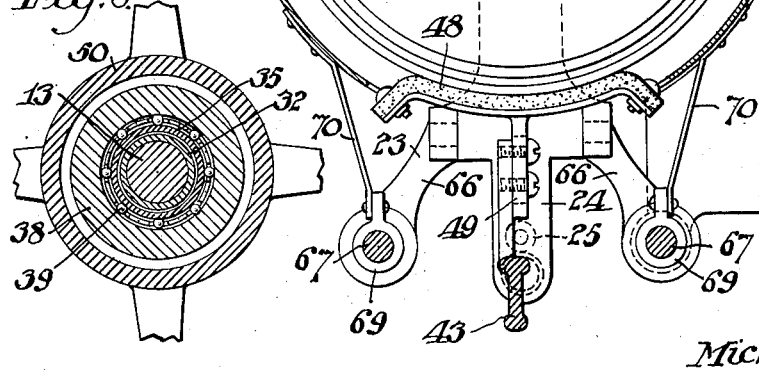

Patented July 25, 1939

2,167,450

UNITED STATES PATENT OFFICE 2,167,450

POWER TRANSMITTING UNIT

Michael I. Ginsburg, Philadelphia, Pa.

Application January 25, 1937, Serial No. 122,207

12 Claims. (Cl. 192—66)

My invention relates to a new and useful power transmission unit and has for one of its objects to provide a unitary transmitter assembly which may be completely preadjusted at the factory.

Another object of this invention is to include an inner tube as a part of the assembly, which inner tube is connected to the main bearing and outer clutch member to rigidly hold said latter elements at a fixed distance apart, said inner tube also serves to hold the transmitter proper in its unitary assembly, said inner tube further functions as one wall of a closed space to make possible centralized lubrication, and furthermore the use of such inner tube permits the assembly to be attached to the shaft at one point so as to allow for unequal expansion between the shaft and the transmitter proper.

Another object of the present invention is to surround the inner tube with an outer tube having one end supported in a bearing carried by the outer clutch member whereby the two will be maintained in concentric relation while the opposite end is connected to the housing of the main bearing. This outer tube serves as a journal for the inner clutch member on which the latter is slidably and rotatably mounted. Said outer tube also functions as the outer wall of the centralized lubrication system and has holes in the regions of the several bearings to permit the application of lubricant thereto.

Another object of the invention is to include a main casting or adjustable hanger which is slidably and swingingly mounted relative to a standard exemplified by the leg of a sewing machine table to which leg said hanger is connected by a supporting shoe vertically adjustable on the leg or standard. Said adjustable hanger or main casting is provided with a toe bolt for leveling and holding the hanger in certain adjustments.

Another object of my invention is to provide a swiveled fork on the adjustable hanger for supporting the main bearing.

Another object of the invention is to construct a flexible coupling of unique formation for joining contiguous units whereby any unit may be removed and/or replaced without disturbing or disassembling the other unit or units. The construction of such coupling while being flexible has not slack and positively centers the coupled elements and compensates for any angular misalignment of the shaft sections.

A further object of the invention is to furnish what I call a formed guard having a slot to permit its passage over parts of the apparatus in assembling and disassembling the same and further provided with hinged legs which in addition to supporting said guard permit the latter to be leveled and adjusted sidewise independently of the other parts of the structure.

A still further object of this invention is to provide a tubular guard for a portion of the shaft and comprising two semi-tubular sections clamped together and to the neck of the formed guard, one of said sections having a detent registering with the slot in said formed guard to prevent undue contraction of the formed guard when both guards are clamped together.

With the above and other objects in view this invention consists of the details of construction and combination of elements hereinafter described and then set forth in the claims.

In order that those skilled in the art to which this invention appertains may understand how to make and use the same I will describe its construction in detail, referring by numerals to the accompanying drawings, in which:

Fig. 1 is a side view, partly in section and partly in elevation, of a power transmission unit construction in accordance with my invention and illustarted as applied to a multiple sewing machine supporting bench or table.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a fragmentary side elevation, on a reduced scale, of a sewing machine bench or table showing one of my units mounted thereon.

Fig. 6 is a section on the line 6—6 of Fig. 1.

Fig. 7 is a section on the line 7—7 of Fig. 1.

Fig. 8 is a section on the line 8—8 of Fig. 1.

Fig. 9 is a sectional elevation of the bifurcated end of the operating lever illustrating a preferred construction.

Fig. 10 is a view similar to Fig. 6 of a modified form of flexible coupling.

In carrying out my invention as herein embodied 10 represents the sewing machine bench including a table 11 and supporting legs 12. While the invention is not limited to use in connection with sewing machines it will be so described for purposes of disclosure. It is usual for a plurality of sewing machines to be mounted on the table in a straight line spaced apart a distance sufficient for the operation of each machine by a different operator.

Mounted on the bench 10 beneath the table 11 and particularly supported by the channel form legs 12 thereof, as will be presently described, is a shaft 13 to which power is applied in any suitable and desired manner. This shaft is preferably positioned in proximity to the underside of the table 11 and in such location that the person or clothing of the operators seated at the bench will not come into contact therewith. The shaft 13 is preferably formed of short sections of such lengths that a transmission unit for each sewing machine will be carried on a separate shaft section and contiguous shaft sections are connected together by flexible couplings 14 which will later be described in detail.

Secured to a leg 12 is a supporting shoe 15 including a leg 16 and a foot 17. Said shoe is adjustably held in place by cap screws 18 passing through vertical slots 19 in the web of the bench leg and threaded into the leg of the shoe and in order to prevent chattering a toe bolt 20 is threaded into the leg of the shoe and engages one of the flanges of the table leg.

One end of a trunnion 21 is mounted in a boss 22 on the leg of the shoe 15 and the other end projects inwardly beneath the table and on the inner free end of said trunnion is mounted the main casting or hanger 23 having a pendant 24 in which is threaded a toe bolt 25 engaging the foot 17 of the shoe 15 to regulate the position of the hanger and hold it in any adjustment.

On the hanger 23 is mounted a fork 26 by means of a bolt 27 with a spring 28 or some equivalent means, such as spring washers, interposed between the hanger 23 and said fork 26. This arrangement permits of rotary and vertical adjustments. Pins 29 on the arms of the fork support a chambered bearing housing 30 in which a ball or roller bearing 31 is mounted. The shaft 13 projects through said bearing 31.

The shaft 13 is surrounded by an inner tube 32 projecting through the bearing housing 30 and its bearing 31, the inner race of the latter being immovably connected to the tube while the outer race is immovably connected to the bearing housing and on the far end of said shaft there is pressed or otherwise fixed an outer clutch member 33, said outer clutch member, the inner tube and the shaft being fastened together by securing means 34, such as a bolt.

Surrounding a portion of the inner tube 32 is a larger outer tube 35 having one end fixed in the bearing housing 30 and the opposite end projecting into a recess 36 in the inner face of the outer clutch member 33. The outer tube 35 being larger than and concentric with the inner tube 32 a lubricant passageway is formed between them. A bearing 37, preferably of the roller bearing type, is interposed between said outer tube 35 and the outer clutch member 33 and retains them concentric.

An inner clutch member 38 is loosely or slidably and rotatably mounted on the outer tube 35 for cooperation with the outer clutch member 33 and a bearing 39, preferably of the roller bearing type, is interposed between said inner clutch member and the outer tube. The open end of the recess 36 and the adjacent end of the hub bore of the inner clutch member 38 are normally closed by washers 40 which are held against their respective clutch members by a spring 41 and by using a spring of sufficient strength said spring will urge the clutch members apart.

The end of the hub bore of the inner clutch member 38, opposite its associated washer 40, has a thrust bearing 42 mounted therein which in addition to closing an end of the hub bore acts to receive the thrust of the bifurcated end of the operating lever 43 pivoted at 44 on a lug which is a part of the hanger 23. The operating lever is urged in one direction by a spring 45 interposed between said lever and the pendant 24 of the hanger 23 and said lever is actuated against the action of the spring by an operator, as through the medium of a treadle 46 and a link 47. The operating lever also carries a brake 48 for coaction with the inner clutch member 38 and the brake shoe is adjustable relative to said inner clutch member by the slide 49.

I have discovered that even when using great care it is seldom possible to obtain the necessary accuracy to cause both horns of the bifurcated end of a solid operating lever to simultaneously contact the thrust bearing. To overcome this disadvantage I prefer to construct the bifurcated end 43ª, Fig. 9, separate from the body portion 43ᵇ and fasten the former to the latter by a screw 43ᶜ projected through a bore in the bifurcated end member and threaded into the body member with a washer 43ᵈ, preferably of the spring type, interposed between said members. This permits the bifurcated end to be adjusted by rotating it. A set screw 43ᵉ may be employed to hold the screw 43ᶜ in place.

A pulley 50, preferably of the grooved type, is mounted on or otherwise connected with the inner clutch member 38 and a belt 51 runs over said pulley and a similar one on the device to be operated, such as a sewing machine mounted on the bench.

As previously stated, the inner and outer tubes 32 and 35 respectively form a lubricant passageway and the outer tube has perforations 52 in the regions of some or all of the bearings except, of course, the bearing 31. The lubricant passageway is in communication with the chamber in the bearing housing 30 and by supplying said chamber with a suitable lubricant the latter will be distributed to the various bearings. The lubricant can be fed to the chamber in the housing 30 by means of a lubricating cup 53. This arrangement provides for centralized lubrication which is highly advantageous in devices of the character herein described.

Attention is called to the fact that after a shaft section has been disconnected, the inner tube with all of the elements thereon can be removed as a unit. Such a construction permits of a complete adjustment of this unit at the factory.

While the flexible coupling 14 may be made of one piece of tempered metal, as shown in Fig. 6, I have discovered that under some conditions it is advisable to construct it of several sections as illustrated in Fig. 10 and designated by the numeral 14ª. The finished coupling is a flat spring and where it is constructed in one piece, the tempering often causes it to warp but by forming such coupling of several similar sections the warping tendency can be better controlled.

In both forms the coupling includes several leaves, for instance, leaves 54, 55 and 56, partially separated or severed from one another by notches 57 and in each leaf is a lateral slot 58, preferably arcuate in shape, to provide a high degree of resiliency or flexibility between the outer and inner parts of the coupling. When such a coupling is assembled for connecting two members or elements the outer part is attached, as by bolts 59, adjacent its outer periphery to one member, as an example, the flange 60, while the inner part is fastened, as by bolts 61, adjacent its inner periphery to the other member, for instance, the hub of the outer clutch member 33, and where the coupling is made up of sections said bolts 61 may hold such sections together. In the present disclosure, the flange 60 is fastened to one of the shaft sections and as the outer clutch member is attached to another shaft section said shaft sections are flexibly connected through the medium of the coupling.

In order to brace the supporting shoe 15, particularly the foot 17 thereof, a rod 62 is carried by said foot and projects through a slot 63 in a cross piece 64 of the bench. The lower end of the rod is threaded to receive the nuts 65 disposed on opposite faces of a wall of the cross piece to clamp the rod in an adjusted position.

With the hanger 23 are formed depending divergent arms 66 in which are mounted bars 67 and supported by the latter is a guard 68 covering portions of the apparatus. Said bars also support sleeves 69 to which are pivoted arms 70 for slight lateral swinging adjustments and these arms support the formed or bell shaped guard 71 which partially surrounds and encloses the main parts of the clutch members and flange 60. Due to the pivoted mounting of the arms 70 the small end of the bell shaped guard 71 provided with the neck 72 can be adjusted vertically to properly align or center the guard after which the arms are tightened on their sleeves 69. Said bell shaped guard 71 has a longitudinal slot or opening 73 the full length thereof and of sufficient width to permit passage of said guard over a part or parts of the apparatus, particularly the shaft 13, for assembling and disassembling such guard. As said bell shaped guard 71 will be fairly rigid when fastened in place, it may be used to hold the guard 68 in its elevated or operative position. To this end an eye 74 is carried by one guard, as the guard 71, having a screw hook or angular bolt 75 connected thereto with the threaded end projected through an angle iron constituting a keeper 76 carried by the other guard, as the guard 68, and a nut 77 screwed onto said angular bolt will adjustably hold the guard 68 in place.

A tubular shaft guard 78, made of two semi-tubular sections 79 and 80, is placed about the shaft 13, and more particularly a shaft section between the main bearing housing and the bell shaped guard 71. One end of this tubular guard engages about a flange 81 on a main bearing housing 30, Figs. 1 and 3, of one unit and the other end of said tubular guard engages about the neck 72 of a bell shaped guard associated with another unit and both ends are secured in place by clamps 82. In order to maintain the opening 73 in the region of the neck end of the bell shaped guard 71 at the proper width, one of the semi-tubular guard members, as 80, is provided with a detent 83 which registers with the opening 73 and is engaged by the edges of the guard which form said opening.

By removing the semi-tubular sections of the tubular guard 78 and releasing the angular bolt 75, the bell shaped guard 71 can be moved back until the large end clears the flange 60 and then passed over the shaft by way of the opening 73.

Outside of the steadying effect derived from the flexible couplings each unit is mounted in a single main bearing through the medium of a shaft section. To dismount a unit, after the guards 78 and 71 have been removed and the guard 68 swung out, the flexible couplings 14 at both ends of a shaft section are disconnected and the entire unitary assembly taken out of the bench by withdrawing the hanger or main casting 23 from the trunnion 21. Another similar unit may then be substituted or the old one repaired and replaced. During the time the repairs are being made a temporary shaft section may be put in between and connected to adjacent shaft sections.

By constructing the main parts of the invention as a completely assembled unit such parts may be adjusted at the factory during assembly and haphazard adjustments on the job are eliminated. When installing the unit on a bench it is only necessary to center and level the unit as a whole. After a number of units have been placed in position the contiguous ends of shaft sections are joined by the flexible couplings and where guards are required they may be installed and adjusted.

Of course I do not wish to be limited to the exact details of construction herein shown and described as these may be varied within the scope of the appended claims without departing from the spirit of my invention.

Having thus described my invention what I claim as new and useful is:

1. A power transmission unit comprising a shaft section, a tube mounted on a portion of said shaft section, a main bearing in which one end of said tube is mounted, an outer clutch member on the other end of the tube, means to fix the shaft, tube and outer clutch member together thereby rigidly holding the outer clutch member at a predetermined distance from the main bearing, an inner clutch member in cooperative relation to the outer clutch member, means to cause said inner clutch member to engage the outer clutch member, a pulley on said inner clutch member and means attached to a portion of the main bearing and projecting into the outer clutch member, one of the purposes of said means being to serve as a support for the inner clutch member on which the latter is slidably and rotatably mounted.

2. A power transmitting unit comprising a shaft, a main bearing including inner and outer races with rolling means between them, a housing surrounding said bearing, an inner tube mounted on a portion of said shaft with one end projecting through the bearing housing and fixed to the inner race of the bearing, an outer clutch member mounted on the opposite end of said inner tube, means to fasten said outer clutch member, said inner tube and shaft together so that they turn in unison, an outer tube of greater diameter than the inner tube and telescoped over the latter with one end fixed in the bearing housing and the other end projected into a recess in the outer clutch member, an inner clutch member slidably rotatably mounted on the outer tube and adapted to cooperate with said outer clutch member, means to shift the inner clutch member toward the outer clutch member, means to urge them apart, and a pulley connected with the inner clutch member.

3. The structure in claim 2, in combination with bearing means in the recess of the outer clutch member retaining the outer tube concentric with said outer clutch member and the inner tube, bearing means for the inner clutch member within its hub bore, means to close an end of the bearing receiving chambers of both clutch members, said closure means being held in place by the means which urges said clutch members apart, said outer tube having apertures in the regions of the clutch bearings whereby they may be lubricated by a lubricant placed in the main bearing housing.

4. The structure in claim 2, in combination with a thrust bearing mounted on one end of the inner clutch member to receive the thrust of the shifting means.

5. The structure in claim 2 wherein the shifting means includes a bifurcated end member mounted to rotate on its axial center.

6. In a device of the character described, a chambered housing to hold a lubricant, a bearing within said housing, a shaft projecting through said bearing and housing, an inner tube mounted on a portion of said shaft with one end fixed in the bearing, one member of a clutch mounted on the other end of the inner tube and said member and the inner tube being fixed to the shaft, and an outer tube having one end fixed in the housing and the other end projected into a recess in said clutch member, said outer tube being of greater diameter than the inner tube and concentric therewith to provide a passageway communicating with the housing chamber and the clutch member recess and said outer tube having apertures at predetermined positions intermediate its ends.

7. In a power transmitting unit, a supporting shoe for adjustable securement to a supporting standard, a trunnion fixed on said shoe, a hanger slidably and rotatably mounted on said trunnion and provided with a pendant and downwardly projecting divergent arms, a toe bolt having threaded connection with the pendant and engaging a portion of the supporting shoe for adjusting the hanger angularly about the trunnion, a resiliently mounted bearing fork on said hanger and capable of vertical and rotatable adjustments, a housing swingingly mounted in the fork, a ball bearing in the housing, a shaft projecting through said bearing and housing, an inner tube mounted on said shaft with one end fixed in the revolvable element of the bearing, an outer clutch member on said inner tube and said inner tube and outer clutch member being fixed to the shaft, an outer tube having one end fixed in the housing and the other end projecting into a recess in the outer clutch member, said outer tube being stationary and spaced a distance from the inner tube to provide a lubricant passageway between the housing and the outer clutch member, an inner clutch member rotatably and slidably mounted on the outer tube for cooperation with the outer clutch member, a pulley connected to said inner clutch member, and a clutch shifting lever pivoted to the hanger and coacting with the inner clutch member.

8. In a power transmission unit, two tubes, one of said tubes being inside of the other with the end of the inner tube projecting beyond the adjacent end of the outer tube, a clutch member fixed on the projecting end of the inner tube and overlapping said adjacent end of the outer tube, and a second clutch member rotatably and slidably mounted on the outer tube for cooperation with the first mentioned clutch member, said tubes and clutch members being assembled as a unitary structure.

9. In a device of the character described, an inner tube, a bearing attached to one end of said tube, a housing for said bearing, an outer clutch member fixed on the opposite end of said inner tube, an outer tube telescoped over the inner tube and having one end attached to the bearing housing and the other end projecting into a recess in the outer clutch member, and an inner clutch member rotatably and slidably mounted on said outer tube for cooperation with the outer clutch member, said tubes, clutch members, bearing and housing being an assembled unit.

10. The combination with a shaft, of an inner tube mounted on said shaft, a bearing attached to one end of said tube, a housing for said bearing, an outer clutch member fixed on the opposite end of said inner tube, an outer tube telescoped over the inner tube and having one end attached to the bearing housing and the other end projecting into a recess in the outer clutch member, and an inner clutch member rotatably and slidably mounted on said outer tube for cooperation with the outer clutch member, said inner tube with all of the elements thereon being detachable as a unit from the shaft.

11. The structure in claim 10 wherein the outer tube has apertures intermediate its ends, a spring to urge the clutch members apart, and a pulley connected to the inner clutch member.

12. In a power transmission unit, two tubes, one of said tubes being inside of the other with an end of the inner tube projecting beyond the adjacent end of the outer tube, a clutch member immovably fixed to the projecting end of the inner tube and overlapping said adjacent end of the outer tube, and a second clutch member rotatably and slidably mounted on the outer tube for cooperation with the first clutch member.

MICHAEL I. GINSBURG.